United States Patent
Choi et al.

(10) Patent No.: US 7,743,187 B2
(45) Date of Patent: Jun. 22, 2010

(54) AUDIO SYSTEM, AND USB/UART COMMON COMMUNICATION SYSTEM FOR THE SAME

(75) Inventors: Jae-Soon Choi, Seoul (KR); Hee-Jun Yoon, Seoul (KR)

(73) Assignee: Telechips, Inc., Seoul (KR)

( * ) Notice: Subject to any disclaimer, the term of this patent is extended or adjusted under 35 U.S.C. 154(b) by 521 days.

(21) Appl. No.: 11/619,802

(22) Filed: Jan. 4, 2007

(65) Prior Publication Data

US 2007/0180170 A1    Aug. 2, 2007

(30) Foreign Application Priority Data

Jan. 5, 2006    (KR) .................. 10-2006-0001525
Feb. 16, 2006   (KR) .................. 10-2006-0014962
Feb. 17, 2006   (KR) .................. 10-2006-0015590

(51) Int. Cl.
*G06F 13/12* (2006.01)

(52) U.S. Cl. .............. 710/64; 710/2; 710/36; 710/63; 710/74

(58) Field of Classification Search .............. None
See application file for complete search history.

(56) References Cited

U.S. PATENT DOCUMENTS

| | | | |
|---|---|---|---|
| 4,972,470 A | 11/1990 | Farago | |
| 5,772,453 A | 6/1998 | Tan et al. | |
| 6,073,201 A | 6/2000 | Jolley et al. | |
| 6,151,653 A | 11/2000 | Lin et al. | |
| 6,836,814 B2 * | 12/2004 | Takaoka et al. | 710/316 |
| 7,103,381 B1 | 9/2006 | Wright et al. | |
| 7,155,214 B2 * | 12/2006 | Struthers et al. | 455/422.1 |
| 2004/0224638 A1 | 11/2004 | Fadell et al. | |
| 2005/0038965 A1 | 2/2005 | Seo et al. | |
| 2006/0052072 A1 | 3/2006 | Hess et al. | |

(Continued)

FOREIGN PATENT DOCUMENTS

JP    1-205222    8/1989

(Continued)

OTHER PUBLICATIONS

U.S. Appl. No. 11/620,174 to Lee, which was filed on Jan. 5, 2007.

(Continued)

*Primary Examiner*—Eron J Sorrell
(74) *Attorney, Agent, or Firm*—Greenblum & Bernstein, P.L.C.

(57) ABSTRACT

An audio system sets a signal line path between the medium of an audio device and an external device and uploads a digital audio file from the external device to the audio device according to a user's manipulation of the audio. In addition, a communication system selectively uses USB and UART communications by commonly using a single USB connector and connects a connector of an external device and an audio/USB/UART common connector through a single cable, so that audio/USB or audio/UART signals are selectively outputted through a common audio signal line. Accordingly, the audio system can interface with various kinds of external devices without external modification or additional installation of a dedicated interface in the audio device with a USB connector. In addition, the USB/UART common communication system can commonly use the USB connector without regard to USB and UART connection signals and can selectively output the audio/USB or audio/UART signals through the single cable in the audio device.

14 Claims, 12 Drawing Sheets

U.S. PATENT DOCUMENTS

2007/0073958 A1* 3/2007 Kalayjian .................. 710/313
2009/0028009 A1* 1/2009 Johnson et al. .......... 369/30.06

FOREIGN PATENT DOCUMENTS

| | | |
|---|---|---|
| JP | 2005-033322 A | 2/2005 |
| KR | 2002 0080186 | 10/2002 |
| KR | 2002-0080186 A | 10/2002 |
| KR | 2002 0090552 | 12/2002 |
| KR | 10-0403376 | 10/2003 |
| KR | 20 0377353 | 2/2005 |
| KR | 20 0403895 | 12/2005 |
| WO | 01/25943 A1 | 4/2001 |
| WO | 02/088973 A1 | 11/2002 |

OTHER PUBLICATIONS

English language Abstract of KR 10-0403376.
English language Abstract of KR 2002-0080186.
English language Abstract of KR 20-0377353.
English language Abstract of KR 2002-0090552.
English language Abstract of KR 20-0403895.
English language Abstract of KR 2002-0080186 A.
English language Abstract of JP 2005-033322 A.
MAX3349E, "USB 2.0 Full-Speed Transceiver with UART Multiplexing Mode," Maxim Integrated Products, Inc., 2006.

* cited by examiner

AUDIO SYSTEM, AND USB/UART COMMON COMMUNICATION SYSTEM FOR THE SAME

BACKGROUND OF THE INVENTION

1. Field of the Invention

The present invention relates to an audio system, in which a signal line path is set by the medium of an audio device and an external device using a universal serial bus (USB) or an expansion connector, a digital audio file stored in the external device is uploaded according to a user's manipulation, and sound is outputted through the audio device.

In addition, the present invention relates to a USB/UART common communication system, in which USB and UART connection signals are automatically detected using a single USB connector, and USB and UART communications can be selectively used by using the detected USB and UART connection signals as a common signal line.

Further, the present invention relates to a USB/UART common communication system, in which a connector of an external device and an audio/USB/UART common connector are connected through a single cable and an audio device selectively outputs an audio/USB or audio/UART signal through a common audio signal line.

2. Description of the Related Art

As various media players become popular, consumers increasingly want to listen to songs stored in a media player through a speaker system of a car audio or home audio device. To this end, an FM transmission function is added to a conventional media player such that a song played by a media player is transmitted over a specific FM frequency. Further, an audio device outputs an audio signal through frequency tuning in an FM reception mode.

In addition, an Aux-line in a conventional audio device is separately extended and connected to an earphone jack of a media player. Like this, as digital media technologies become popular, consumers increasingly want to directly play digital contents stored in a USB memory through a speaker system of a car audio or home audio device.

To this end, there is a patent application entitled "A MEDIAL PROCESSING DEVICE USING AN EXTERNAL STORAGE DEVICE", filed by the present applicant on Apr. 4, 2002 (Korean Patent Application No. 2003-21307) and issued on Oct. 15, 2003 (Korean Patent Registration No. 403,376). According to this patent, an audio device includes a USB host interface to directly read and play contents stored in a USB memory.

A media storage or media player using the above-described digital media technology includes a product group of MP3 player or USB flash disk (UFD) using a standard USB, and a product group of Apple iPod using universal asynchronous receiver/transmitter (UART) and IEEE 1394 as an interface.

In the Apple iPod illustrated in FIG. 1, an MP3 player 10 includes a 32-pin connector 11 and an IEEE 1394 connector 12. The IEEE 1394 connector 12 is connected to an Apple PC and used to download an MP3 file. The MP3 player 10 is connected to a remote controller and used to control the device in a UART communication scheme and display song information.

In addition, as illustrated in FIG. 2, the 32-pin connector 11 of the MP3 player 10 is connected to a 32-pin connector 21 additionally installed in a car audio 20. The car audio 20 receives song information in a UART communication scheme and provides device control information to the MP3 player 10. In this way, a car audio package using the 32-pin connector is provided. Such a car audio is called an "iPod ready" and an analog audio is separately connected through an Aux-line.

In recent years, USB connectors tend to be mounted in the car audio. Therefore, in order to implement the iPod ready or UART communication, the car audio must include both an expansion connector and a USB connector, causing space deficiency and design problem.

Because the Apple iPod can be connected only through a dedicated interface and a player using the UART communication has an expansion connector and a USB connector different from each other, there is a limit in using the conventional scheme, if the interface of the car audio is not additionally provided. Although consumers purchase a lot of the Apple iPods or UART communication products, the utilization is not high.

Moreover, USB, UART, and AUDIO connectors are separately provided in the existing car audio or home audio system. Thus, when the USB and the AUDIO connectors are used, a USB cable and an AUDIO cable must be separately used. In addition, when the UART and AUDIO connectors are used, a UART cable and an AUDIO cable must be separately used.

SUMMARY OF THE INVENTION

An object of the present invention is that it provides an audio system that can provide an interface between an external device and an audio device without limiting any connection module specification for communication or interface of the external device, and can upload a digital audio file stored in the external device according to a user's manipulation of the audio device, such that sound is outputted from the audio device.

Another object of the present invention is that it provides a USB/UART common communication system that can provide an interface to an external device without limiting any connection module specification for communication or interface of the external device.

A further object of the present invention is that it provides a USB/UART common communication system that detects USB and UART connection signals from an external device through a single USB connector and switches to connect the detected connection signals to USB or UART data signal lines, so that USB and UART communications are selectively enabled.

A further object of the present invention is that it provides a USB/UART common communication system that can selectively output audio/USB or audio/UART signals through a common audio signal line by using a single audio/USB/UART common connector connected to a connector of the external device In order to accomplish the above objects, the present invention provides an audio system with an external device, comprising: an adapter having an external device connector at one terminal and a USB connector at another terminal to provide a signal connection therebetween, the external device connector being provided for connection to an external device; and an audio device including: a USB connector for providing an interface to an external device directly connected thereto or an external device connected through the adapter; a multiplexer for selecting one of a USB signal line and a serial signal line as a signal path with respect to the USB connector according to a select control signal; a USB controller connected to the external device through a USB communication during a path setting of the USB signal line and decoding a digital audio file received from the external device to thereby output a sound; a serial controller connected to the external device through the adapter during a path setting of the serial signal line and receiving song information through a serial communication so as to provide the external device with a device control signal based on a user's manipulation; and an audio controller for providing the multiplexer with the select control signal according to device identification when the external device is connected through the USB connector, wherein the audio controller provides the digital audio file from the external device through the USB controller when the external device is a USB device, and receives the song information from the external device through the serial controller and provides the device control signal to the external device when the external device is not the USB device, so that the external device is driven according to the device control signal.

In order to accomplish the above objects, the audio controller of the audio system according to the present invention performs USB communication or serial communication when the external device is connected to the USB connector, and sets a signal path by determining whether the external device is the USB device.

In order to accomplish the above objects, the present invention provides an audio system with an external device, comprising: an adapter having an external device connector at one terminal and a USB connector at another terminal to provide a signal connection therebetween, the external device connector being provided for connection to an external device; and an audio device including: a USB connector for providing an interface to an external device directly connected thereto or an external device connected through the adapter; a USB controller connected to the external device through a USB communication during a path setting of the USB connector and the USB signal line and decoding a digital audio file received from the external device to thereby output a sound; a serial controller connected to the external device through the adapter during a path setting of the USB connector and the serial signal line and receiving song information through a serial communication so as to provide the external device with a device control signal based on a user's manipulation; and an audio controller for setting a path of the USB or serial signal line, based on identification of the external device, according to the USB or serial communication result when the external device is connected through the USB connector, wherein the audio controller provides the digital audio file from the external device through the USB controller when the external device is a USB device, and receives the song information from the external device through the serial controller and provides the device control signal to the external device when the external device is not the USE device, so that the external device is driven according to the device control signal.

In order to accomplish the above objects, the serial communication done in the audio system according to the present invention is a universal asynchronous receiver/transmitter (UART).

In order to accomplish the above objects, the adapter of the audio system according to the present invention transmits and receives a UART signal to the USB connector through a signal line connection of an expanded external connector and the USB connector, so that the signal connection is provided between an external device having an expansion connector and an audio device having the USB connector.

In order to accomplish the above objects, the present invention provides a USB/UART common communication system comprising: a connector for providing an interface to an external device, which connector having signal lines (D+_RXD, D−_TXD); an analog switch for selecting one of UART data signal lines (UART_TXD, UART_RXD) and USB data signal lines (USB_HD+, USB_HD−) with respect to the signal lines (D+_RXD, D−_TXD) of the connector according to the select control signal; and a system controller for setting the UART data signal lines as GPIO ports, reading signal levels of the UART data signal lines, and detecting whether the connector is connected to the UART or the USB according to the reading result, wherein when the UART connection signal is detected, the system controller sets the UART data signal lines as the UART ports, connects the UART data signal lines and the connector signal lines according to the select control signal, performs a UART communication; and when the USB connection signal is detected, the system controller connects the USB data signal lines and the connector signal lines through the analog switch and then performs a USB communication.

In order to accomplish the above objects, the USB/UART common communication system according to the present invention determines that the UART is connected to the connector when the D−_TXD signal line is HIGH and the D+_RXD signal line is LOW.

In order to accomplish the above objects, the present invention provides a USB/UART common communication system comprising: a connector for providing an interface to an external device, the connector having first signal line ports (GPIO_TXD, GPIO_USB_HD+) and second signal line ports (GPIO_RXD, GPIO_USB_HD−) connected to signal line data (D+, D−); and a system controller for setting the first and second signal line ports as GPIO ports, reading signal levels of the UART data signal lines, and detecting whether the connector is connected to the UART or the USB according to the reading result, wherein when the UART connection signal is detected, the system controller sets the UART signal line ports (GPIO_TXD, GPIO_RXD) as UART ports and performs a UART communication; and when the USB connection signal is detected, the system controller sets the USB signal line ports (GPIO_USB_HD+, GPIO_USB_HD−) as USB ports and then performs a USB communication.

In order to accomplish the above objects, the USB/UART common communication system according to the present invention determines that the UART is connected to the connector when the second signal line port (GPIO_RXD) is HIGH and the first signal line port (GPIO_TXD) is LOW.

In order to accomplish the above objects, the USB/UART common communication system according to the present invention determines that the USB is connected to the connector when the first signal line port (GPIO_TXD) is HIGH and the second signal line port (GPIO_RXD) is LOW.

In order to accomplish the above objects, the present invention provides a USB/UART common communication system comprising: a connector for providing an interface to an external device, which connector having signal lines (D+_RXD, D−_TXD); an analog switch for selecting one of GPIO detection signal lines (GPIO_A, GPIO_B), UART data signal lines (UART_TXD, UART_RXD), and USB data signal lines (USB_HD+, USB_HD−) with respect to the connector signal lines (D+_RXD, D−_TXD) according to a select control signal; and a system controller for reading signal levels of the connector signal lines, and for detecting whether the connector is connected to the UART or the USB according to the reading result, wherein when the UART connection signal is detected, the system controller connects the UART data signal lines and the connector signal lines according to the select control signal and then performs a UART communication; and when the USB connection signal is detected, the system controller connects the USB data signal lines and the connector signal lines through the analog switch and then performs a USB communication.

In order to accomplish the above objects, the USB/UART common communication system according to the present invention determines that the UART is connected to the connector when the GPIO detection signal line (GPIO_B) is HIGH and the GPIO detection signal line (GPIO_A) is LOW.

In order to accomplish the above objects, the USB/UART common communication system according to the present invention determines that the USB is connected to the connector when the GPIO detection signal line (GPIO_A) is HIGH and the GPIO detection signal line (GPIO_B) is LOW.

In order to accomplish the above objects, the present invention provides a USB/UART common communication system comprising: an external device connector connected to an external device to provide an audio interface; a connector body for commonly connecting an audio signal and a USB/UART signal; a communication cable for connecting the audio signal and the USB/UART signal between the external device connector and the connector body; and an audio device connected to the connector body to selectively receive audio/USB or audio/UART signal.

In order to accomplish the above objects, the connector body of the USB/UART common communication system according to the present invention includes an audio jack and a single USB/UART connector, and the audio device includes an audio jack connector corresponding to the audio jack, and a USB/UART connector corresponding to the USB/UART connector.

In order to accomplish the above objects, the present invention provides a USB/UART common communication system comprising: an external device connector connected to an external device to provide an audio interface; a connector body for commonly connecting an audio signal and a USB/UART signal, the connector body having an audio jack and a single USB/UART connector; and a communication cable for connecting the audio signal and the USB/UART signal between the external device connector and the connector body.

BRIEF DESCRIPTION OF THE DRAWINGS

These and/or other aspects and objects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
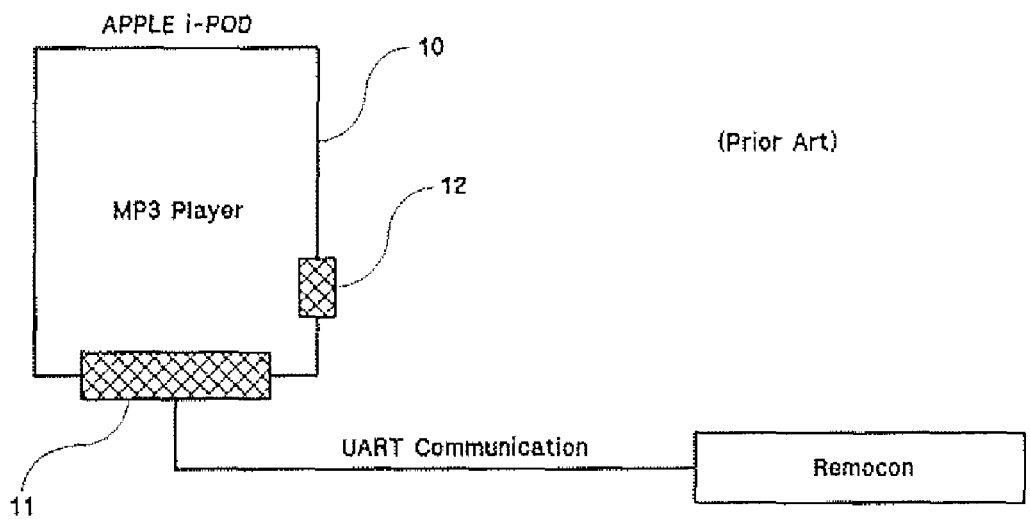
FIG. 1 is a block diagram illustrating a connection between a conventional MP3 player and a remote controller.
Figure 2:
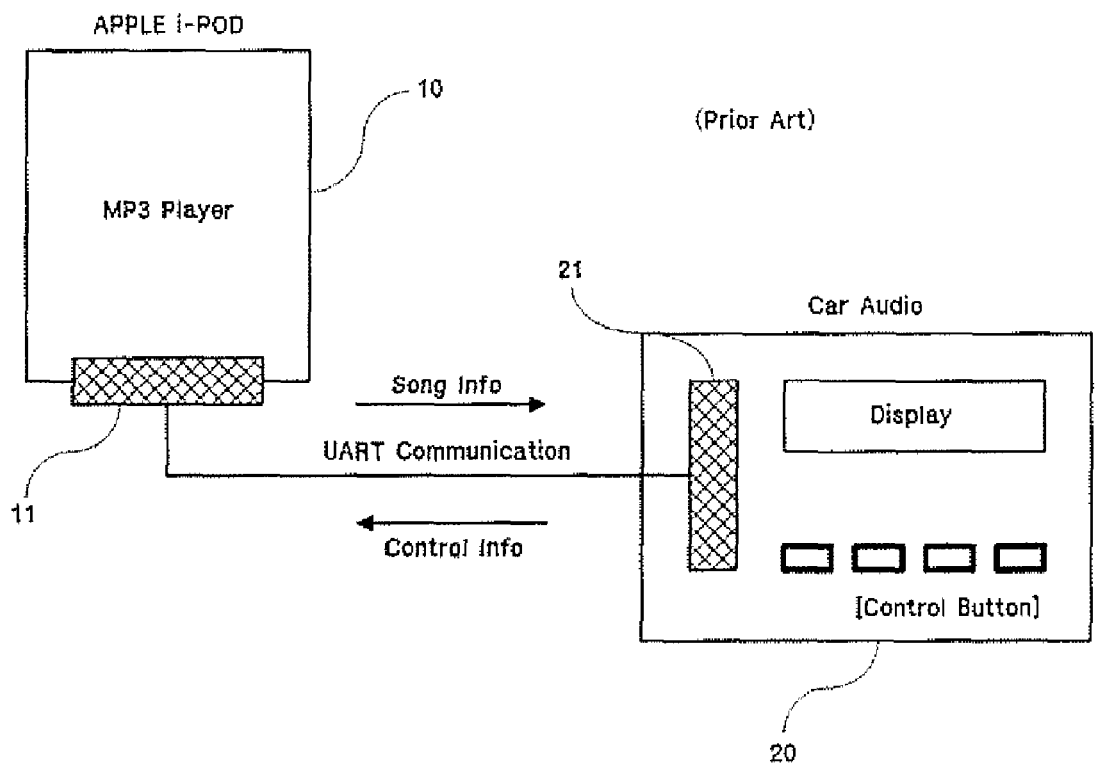
FIG. 2 is a block diagram illustrating a connection between a conventional MP3 player and a car audio.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

An audio system according to the embodiments of the present invention will be described below in detail with reference to FIGS. 3 to 7.

Figure 3:
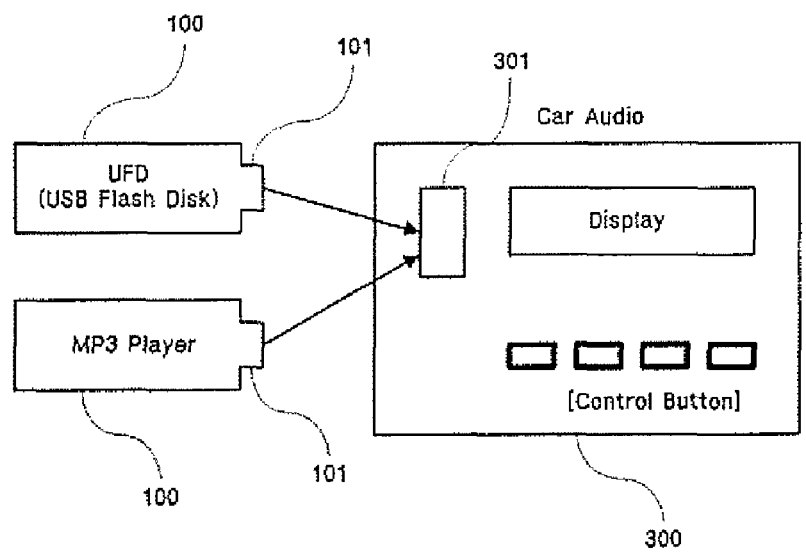
FIG. 3 is a block diagram illustrating a connection of an external device using a standard USB in an audio system according to an embodiment of the present invention.
Figure 4:
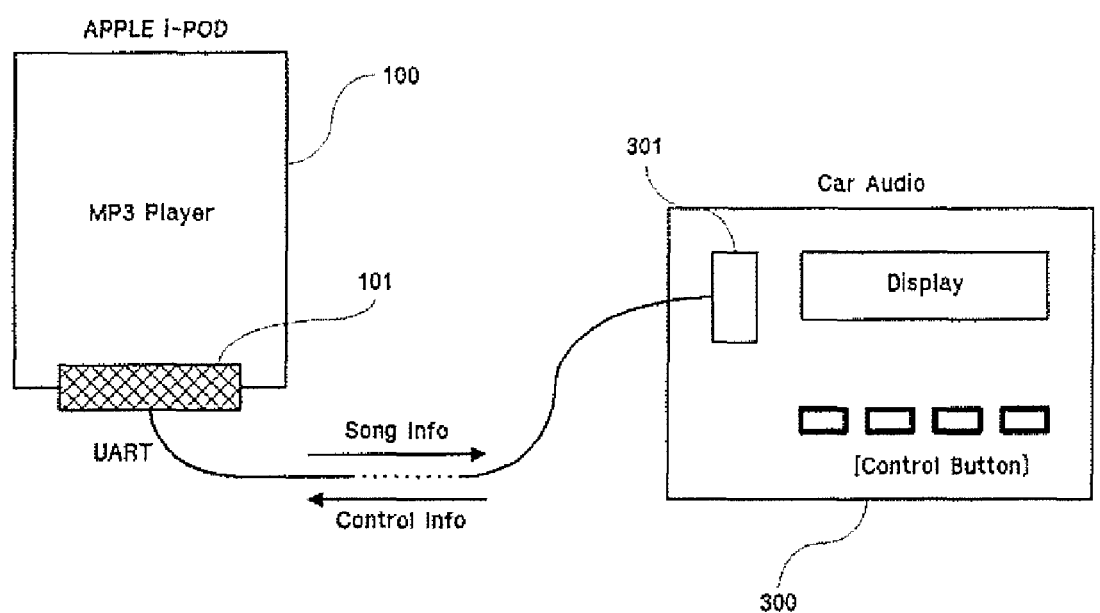
FIG. 4 is a block diagram illustrating a connection of an external device using a serial communication in an audio system according to an embodiment of the present invention.
Figure 5:
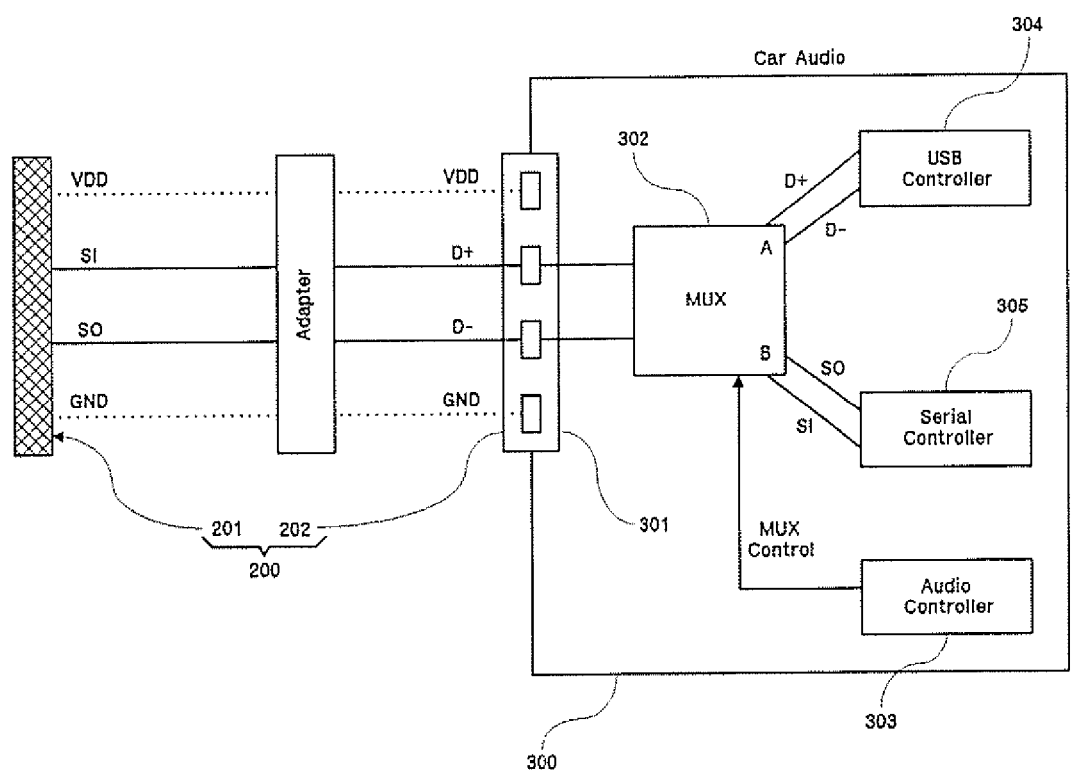
FIG. 5 is a block diagram illustrating a connection between an adapter and an audio device in an audio system according to an embodiment of the present invention.

FIG. 3 is a block diagram illustrating a connection of an external device using a standard USB in an audio system according to an embodiment of the present invention, FIG. 4 is a block diagram illustrating a connection between an external device using a serial communication in an audio system according to an embodiment of the present invention, and FIG. 5 is a block diagram illustrating a connection between an adapter and an audio device in an audio system according to an embodiment of the present invention.

As illustrated in FIGS. 3 to 5, the audio system accommodating an external device 100 includes an adapter 200 and an audio device 300.

The external device 100 provides an interface for the audio device 300 and includes an external device connection module 101 connected to the adapter 200 or the audio device 300. The external device 100 stores various digital media information or plays the stored digital media information.

Referring to FIG. 3, the external device 100 may be a USB flash disk (UFD) or an MP3 player, which uses a standard USB as the external device connection module 101.

Referring to FIG. 4, the external device 100 includes an expansion connector. The external device 100 may be an MP3 player based on a UART communication, which uses a 32-pin connector as the external device connection module 101. A representative example of such an MP3 player is an Apple iPod.

The adapter 200 includes an expanded external connector 201 at one end and a USB connector 202 at another end. The expanded external connector 201 is connected so as to correspond to the external device connection module 101 of the external device 100. The adapter 200 provides a signal connection between the external device 100 and the audio device 300.

Referring to FIG. 5, the audio device 300 includes a single USB connector 301, a multiplexer 302, an audio controller 303, a USB controller 304, and a serial controller 305. The audio device 300 includes a host player function and a function of controlling the Apple iPod MP3 player.

Although the 32-pin expansion connector has been described as an example of the external connector 201 disposed at one end of the adapter 200, the present invention is not limited to this. It should be construed that the expansion connector can be modified and connected so as to correspond to the number of pins of the expansion connector in the external connection module 101 provided in the external device 100.

Referring to FIG. 5, the audio device 300 includes a single USB connector 301, a multiplexer 302, an audio controller 303, a USB controller 304, and a serial controller 305. The audio device 300 includes a host player function and a function of controlling the Apple iPod MP3 player.

The USB connector 301 provides an interface to the external device 100 directly connected thereto, or the external device 100 connected through the adapter 200. The multiplexer 302 selects a USB signal line or a serial signal line as a signal path with respect to the USB connector 301 according to a select control signal provided from the audio controller 303.

As illustrated in FIG. 3, when the UFD 100 using the standard USB as the interface is directly connected to the audio device 3001 a digital audio file (data) is uploaded from the inner storage space of the UFD 100 connected to the car audio, and the audio device 300 then decodes the uploaded digital audio file to output an audio sound through the speaker system.

To this end, the audio device 300 has a USB host function. The audio device 300 accesses the flash memory of the UFD 100 through the USB interface and reads the corresponding data.

FIG. 4 is a block diagram illustrating a connection of the external device using the serial communication in the audio system according to an embodiment of the present invention Specifically, the MP3 player of the Apple iPod product group is connected through the 32-pin expansion connector and transmits/receives song information and device control signal to the UART during the serial communication.

When the external device 100 is connected through the USB connector 301, the audio controller 303 provides the multiplexer 302 with the select control signal based on device identification When the external device 100 is the USB device, the audio controller 303 performs control such that the digital audio file is provided from the external device 100 through the USB controller 304. When the external device 100 is not the USB device, the audio controller 303 performs control such that the song information is received from the external device 100 through the serial controller 305, and the device control signal according to the user's manipulation is provided to the external device 100 to drive the external device 100 in accordance with the device control signal.

In addition, when the external device 100 is connected through the USB connector 301, the audio controller 303 performs a USB or serial communication. The audio controller 303 determines whether the external device 100 is a USB device, and generates the select control signal to the multiplexer 302. Although it is preferable that the serial communication is the UART, the present invention is not limited to the serial communication, but can be modified in various ways.

Figure 6:
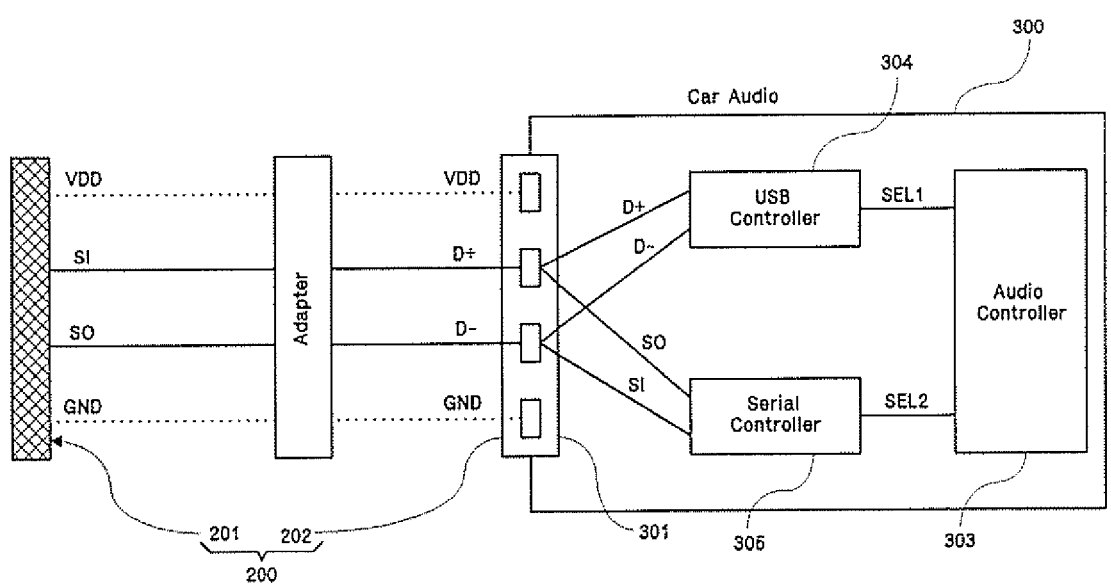
FIG. 6 is a block diagram illustrating a connection between an adapter and an audio device in an audio system according to another embodiment of the present invention.

FIG. 6 is a block diagram illustrating a connection between the adapter and the audio device in the audio system according to another embodiment of the present invention. The audio system of FIG. 6 is identical to that of FIG. 5, but is different in that the multiplexer 302 is not included. Therefore, unnecessary description will be omitted for conciseness.

Referring to FIG. 6, when the external device 100 is connected through the USB connector 301, the audio controller 303 performs a communication to provide a select signal to the USB controller 304 or the serial controller 305. Then, in accordance with the result of the communication, the audio controller 303 sets a path of the USB or serial signal line according to the identification of the external device 100.

The select signal is exclusively driven. The communication is performed with one of the USB controller 304 and the serial controller 305, and the path of the signal line is set according to the result of the communication.

When the result of the communication using the select signal is the USB, the path of the USB signal line is set between the USB connector 301 and the USB controller 304. When the result of the communication is not the USB, the path of the serial signal line is set between the USB connector 301 and the serial controller 305.

When setting the path of the USB signal line, the USB controller 304 is connected to the external device 100 through the USB communication, receives the digital audio file from the external device 100, and decodes the received digital audio file to output the sound.

When setting the path of the serial signal line, the serial controller 305 is connected to the external device 100 through the adapter 200, receives the song information from the external device 100 through the serial communication, and provides the external device 100 with the device control signal based on the user's manipulation.

Figure 7:
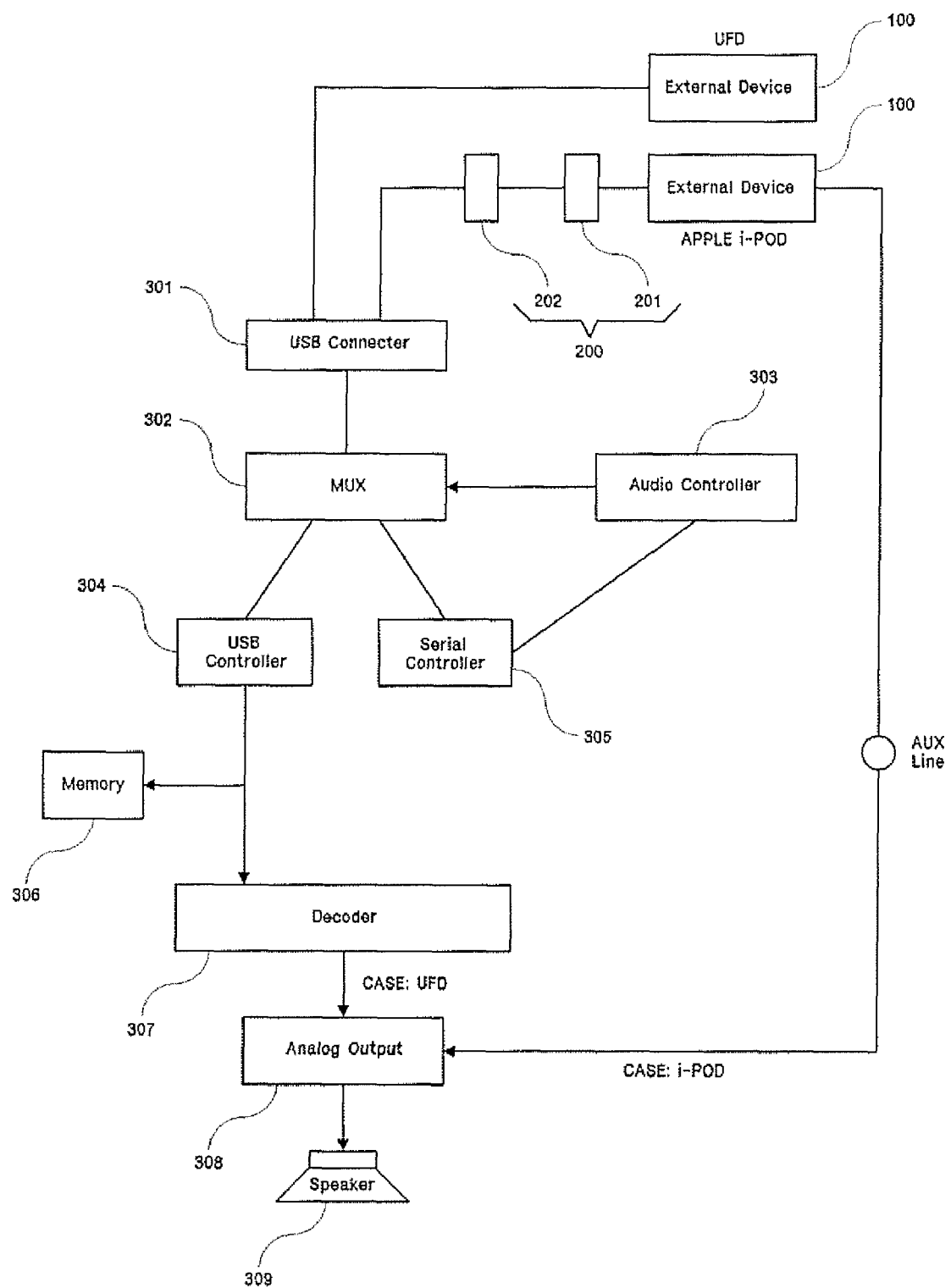
FIG. 7 is a block diagram of an audio system according to an embodiment of the present invention.

FIG. 7 is a block diagram of an audio system according to an embodiment of the present invention. The case where the external device 100 connected to the audio system is the USB device and the case where the external device 100 is not the USB device will be described with reference to FIG. 7.

When the external device 100 is connected to the USB connector 301, the audio controller 303 performs a USB or serial communication and determines whether the external device 100 is the USB device. Then, the audio controller 303 generates a corresponding select control signal to the multiplexer 302.

The multiplexer 302 selects one of the USB signal line and the serial signal line as a signal path with respect to the USB connector 301 according to the received select control signal. When the multiplexer 302 selects the USB signal line as the signal path, the USB connector 301 is connected to the USB controller 304. When the multiplexer 302 selects the serial signal line as the signal path, the USB connector 301 is connected to the serial controller 305.

The signal line path can also be set through the audio controller 303 of FIG. 6. Because only a difference is the method of setting the signal line path, a detailed description of its operation will be omitted.

When the external device 100 is the USB device, the audio controller 303 performs control such that the digital audio file stored in the external device 100 is provided through the USB controller 304.

The digital audio file provided to the USB controller 304 under control of the audio controller 303 is stored in the memory 306 and loaded according to the device control signal based on the user's manipulation. Then, the digital audio file is decoded by the decoder 307 and outputted as an audio sound through the analog output unit 308 and the speaker 309.

When the external device 100 is not the USB device, the audio controller 303 receives the song information from the external device 100 through the serial controller 305, and provides the device control signal based on the user's manipulation through the serial signal line to the external device 100.

The external device 100 is driven in response to the device control signal and decodes the selected audio file to output a corresponding sound. The outputted sound is provided to the analog output unit 308 through the Aux line illustrated in FIG. 6, and then the audio sound is outputted through the speaker 309.

As described above, using the USB connector 301 of the car audio, the audio system of the present invention can set the path of the specific signal line without regard to the communication of the external device 100 or interface module specification. The audio system provides the device control signal generated by the path setting of the signal line to the external device 100, and receives the digital audio file from the external device 100. Then, the audio system decodes the digital audio file to output the audio sound through the speaker of the car audio.

A USB/UART common communication system according to an embodiment of the present invention will be described below in detail with reference to FIGS. 8 to 14.

Figure 8:
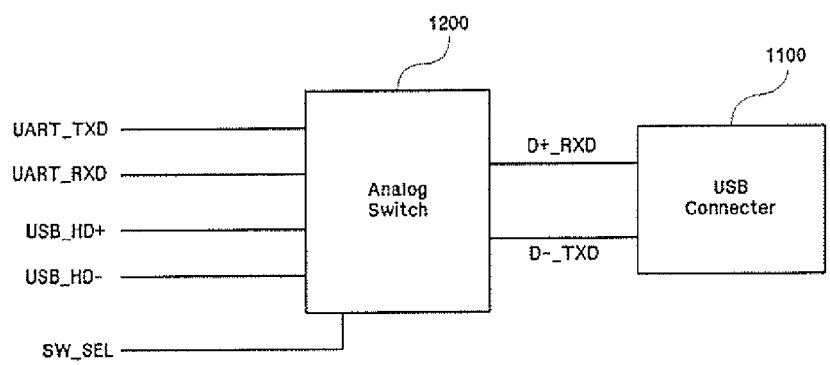
FIG. 8 is a block diagram of a USB/UART common communication system according to an embodiment of the present invention.
Figure 9:
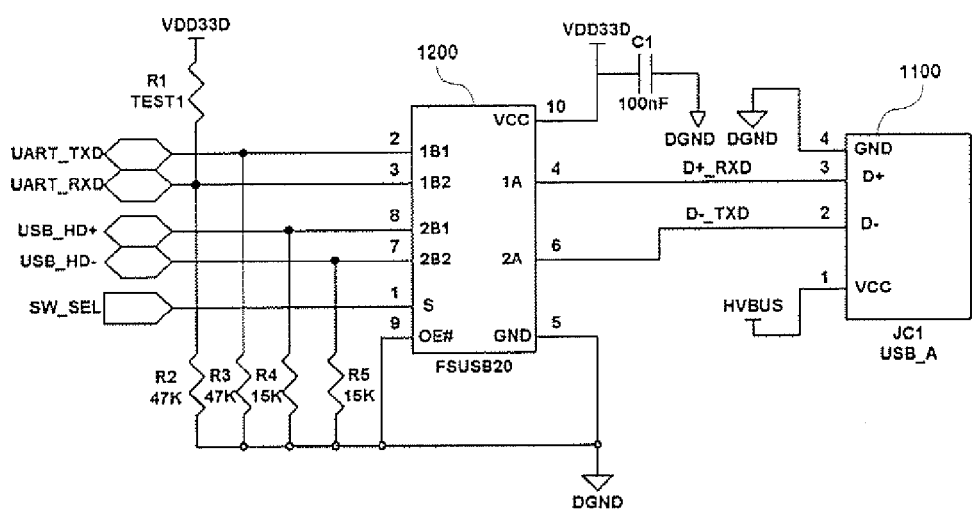
FIG. 9 is a circuit diagram of the USB/UART common communication system of FIG. 8.

FIG. 8 is a block diagram of a USB/UART common communication system according to an embodiment of the present invention, and FIG. 9 is a circuit diagram of the USB/UART common communication system of FIG. 8.

Before describing the structure and operation of the USB/UART common system of the present invention, the concept of the UART and the USB will be first described. The kinds of the communication ports widely used for data transmission include the UART and the USB.

The UART is an asynchronous serial communication processor and exists in all computers in order to manage the serial port. In addition, all internal modem includes their UARTs. Such a UART provides an RS-232C interface to the computer, such that it can communicate with the modem or other serial devices or can transmit/receive data to/from the modem or other serial devices.

The USB is an interface specification for connection of a peripheral device, which is commonly proposed by seven companies including IBM. The USB aims to provide a common interface for connecting the peripheral devices to a personal computer. When the peripheral device is connected to the personal computer, the USB can connect the peripheral devices without separately setting software or hardware. Therefore, the number of ports can be remarkably reduced. Moreover, the USB is easy to install and a portable computer can be scaled down.

Referring to FIGS. 8 and 9, in the USB/UART common communication system, a USB connector signal line D+_RXD and a USB connector signal line D−_TXD are connected between one port of the USB connector 1100 and one port of the analog switch 1200. The USB connector signal line D+_RXD is connected to a UART transmission signal (TXD) port or a USB host data (D+) signal (HD+) port. The USB connector signal line D−_TXD is connected to a UART reception signal (RXD) port or a USB host data (D−) signal (HD−) port.

Another port of the analog switch 1200 is connected to the UART transmission signal (TXD) port, the UART reception signal (RXD) port, the HD+ port, the HD− port, and the switch selector SW_SEL.

Although not shown in FIG. 8, the signal lines UART_TXD, UART_RXD, USB_HD+, USB_HD−, SW_SEL, SW1, SW2 and SW3 provided to the analog switch 1200 can be provide from or to the controller of the system.

Referring to FIG. 9, a capacitor C1 has one terminal connected to a pin No. 10 of the analog switch 1200 and a power VDD, and another terminal connected to a ground voltage. The capacitor C1 reduces ripples and noises in order to supply a stable constant voltage.

The USB connector 1100 provides an interface to the external device directly connected or an external device connected through an adapter. In addition, the USB connector 1100 may be a standard USB connector or a separately designed connector.

The analog switch 1200 selects one of the UART connector signal line and the USB connector signal line as the path according to the select control signal of the switch selector SW_SEL.

In the path setting conditions of the switch selector SW_SEL, when the USB connector signal line D−_TXD is HIGH (3.3 V) and the USB connector signal line D+_RXD is LOW (0 V) in a default, i.e., an initial state, the path of the UART data line is selectively set. When the D−_TXD port of the USB connector signal line is LOW (0 V) and the D+_RXD port of the USB connector signal line is HIGH (3.3 V), the path of the USB data line is selectively set. In this way, the USB or UART communication is performed.

Figure 10:
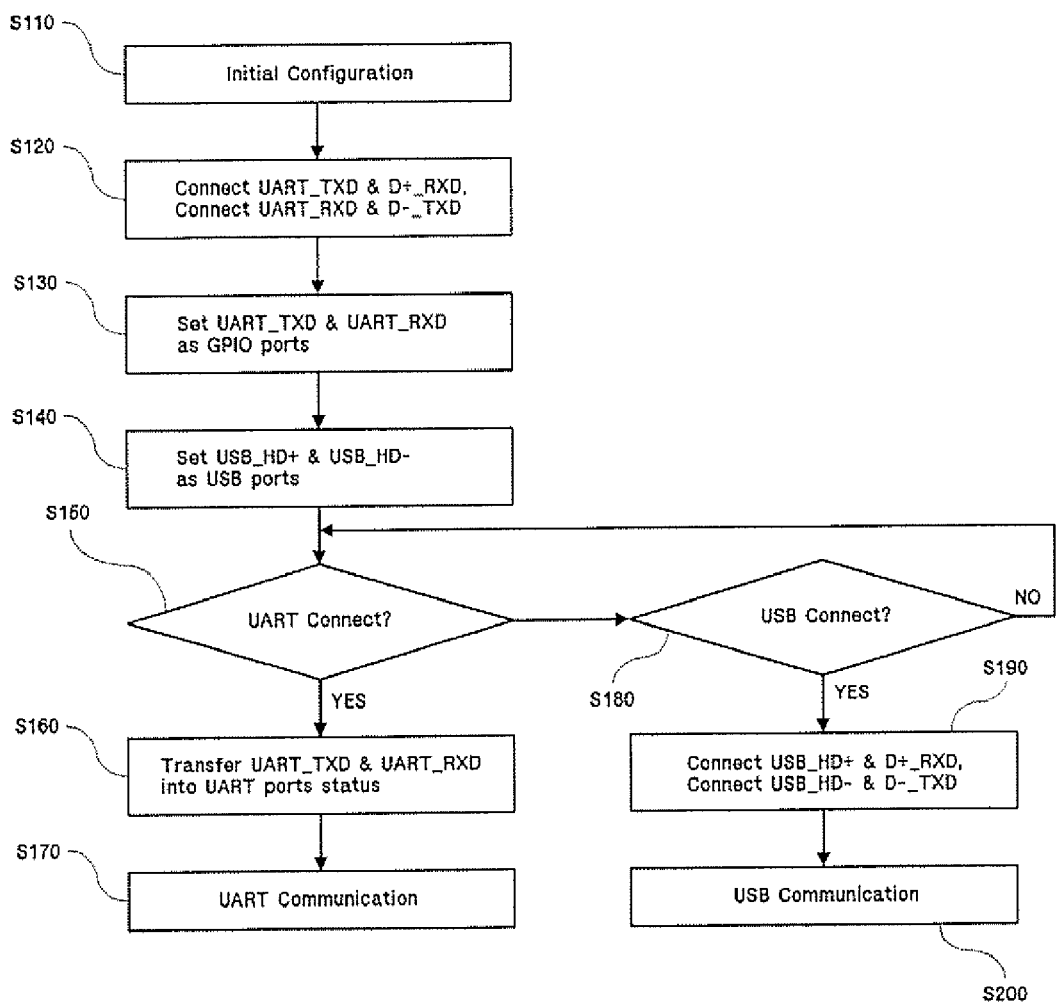
FIG. 10 is a flowchart illustrating an operation of a USB/UART common communication system according to an embodiment of the present invention.

FIG. 10 is a flowchart illustrating an operation of a USB/UART common communication system according to an embodiment of the present invention.

Referring to FIG. 10, the switch selector SW_SEL connected to the analog switch 1200 is set to the initial state, i.e., a default LOW (0 V) state (S110).

In the default state of the switch selector SW_SEL, the UART transmission signal (TXD) port and the D+_RXD port of the USB connector signal line are connected to each other, and the UART reception signal (RXD) port and the D−_TXD of the USB connector signal line are connected to each other (S120).

The UART transmission signal (TXD) port and the UART reception signal (RXD) port are set as an input port (INPUT) state as a GPIO port function (S130).

The HD+ port of the USB host data (D+) signal and the HD− port of the USB host data (D−) signal are set as a USB port state (S140).

In this state, the TXD port (GPIO PORT) signal of the UART transmission signal and the RXD port (GPIO PORT) signal of the UART reception signal from the external device are read into the USB connector 1100. The values are compared with a LOW (0 V) state or a HIGH (3.3 V) state, and it is determined whether the UART connection signal exists (S150).

When the UART connection signal from the external device exists in the USB connector 1100, the TXD port and the RXD port are changed to the UART port status from the GPIO function (S160). Therefore, the UART communication can be provided (S170).

When the UART connection signal from the external device does not exist, the TXD port (GPIO PORT) signal of the UART transmission signal and the RXD port (GPIO PORT) signal of the UART reception signal are read. Then, the values are compared with a HIGH (3.3 V) state or a LOW (0 V) state and it is determined whether the USB connection signal exists (S180).

When the USB connection signal from the external device exists in the USB connector 1100, the switch selector SW_SEL of the analog switch 1200 is set to the HIGH (3.3 V) state.

At this point, the HD+ port as the USB host data (D+) signal is connected to the D+_RXD port of the USB connector signal line, and the HD− port as the USB host data (D−) signal is connected to the D−_TXD port of the USB connector signal (S190). In this way, the USB communication can be provided (S1200).

When the signal from the external device is not the USB connection signal, it is determined that there is no USB or UART connection signal in the external device.

As described above, when the D+_RXD of the USB connector signal line is HIGH (3.3 V) and the D−_TXD of the USB connector signal line is LOW (0 V), it is determined that there is the USB connection signal (a status in which the USB is inserted) from the external device. When the D−_TXD of the USB connector signal line is HIGH (3.3 V) and the D+_RXD of the USB connector signal line is LOW (0 V), it is determined that there is the UART connection signal (a status in which the UART is inserted) from the external device.

Therefore, the detection conditions (a state in which pull-down resistor is connected) of the UART or USB connection signal from the external device satisfy values of Table 1 below.

TABLE 1

|  | D−_TXD or UART_RXD | D+_RXD or UART_TXD |
|---|---|---|
| NONE | LOW (0 V) | LOW (0 V) |
| UART Connection | HIGH (3.3 V) | LOW (0 V) |
| USB Connection | LOW (0 V) | HIGH (3.3 V) |

In addition, an external UART device is connected to the USB/UART common communication system, and pull-up resistors are inserted into UART_TXD and UART_RXD, which are two signals of the UART device. In this case, the UART connection condition can be changed.

At this point, although the UART connection is achieved, D−_TXD of the USB connector signal line may be HIGH (3.3 V) and D+_RXD of the USB connector signal line may be HIGH (3.3 V). Therefore, the detection conditions of the UART connection can be modified according to the D−_TXD state without regard to the D+_RXD state (LOW or HIGH).

In addition, although the above description has been made about the microcontroller unit (MCU) commonly using the GPIO port and the UART port and using the analog switch 1200, the present invention can also be applied to an MCU commonly using the GPIO port and the UART port and using no analog switch 1200. Further, the present invention can be applied to the case where the GPIO port and the UART port are not commonly used, that is, the UART port is used as the dedicated port of the MCU.

Figure 11:
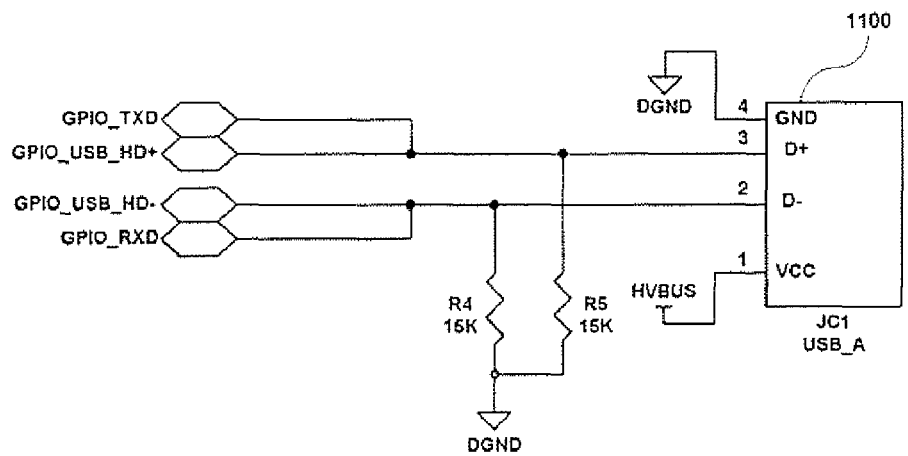
FIG. 11 is a circuit diagram of a communication system commonly using USB/UART/GPIO functions according to an embodiment of the present invention.
Figure 12:
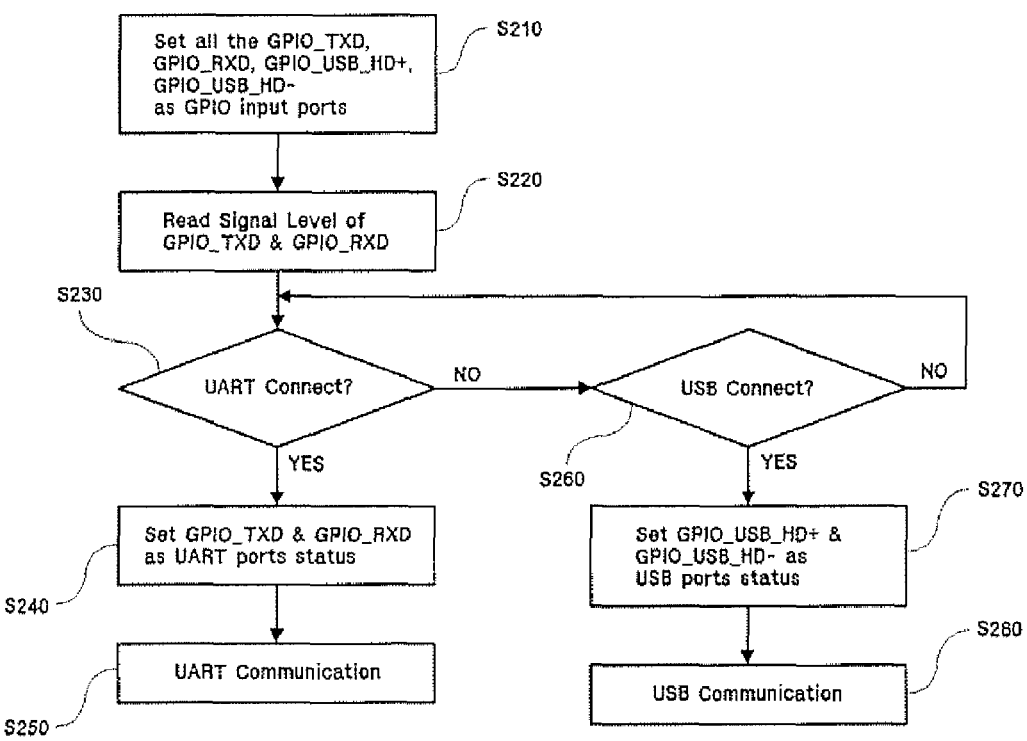
FIG. 12 is a flowchart illustrating an operation of a communication system commonly using USB/UART/GPIO functions according to an embodiment of the present invention.

FIG. 11 is a circuit diagram of a communication system commonly using USB/UART/GPIO functions according to an embodiment of the present invention, showing a case where the analog switch is not used. FIG. 12 is a flowchart illustrating an operation of a communication system commonly using USB/UART/GPIO functions according to an embodiment of the present invention.

Referring to FIG. 11, a GPIO_TXD port is connected to a GPIO_USB_HD+ port that is connected to a pull-down resistor, and a GPIO_RXD port is connected to a GPIO_USB_HD-port that is connected to a pull-down resistor. The GPIO_USB_HD+ port and the GPIO_USB_HD− port are connected to one end of the USB connector 1100. At this point, the GPIO port performs a general input/output port function.

In such a circuit configuration, the analog switch does not need to be used when the system controller selects one of the UART port and the GPIO port and selects one of the USB port and the GPIO port.

That is, in the initial status, the signal of the UART transmission signal (TXD) port of the external device is HIGH (3.3 V) and the signal line of the USB device data (D+) is HIGH (3.3 V).

Thus, the USB or UART can be easily selected using the levels of the TXD port and the HD+ port (that is the USB host data (D+).

More specifically, referring to FIG. 12, the GPIO_TXD port and the GPIO_RXD port are set as GPIO input ports, and the GPIO_USB_HD+ port and the GPIO_USB_HD− port are set as GPIO input ports (S210).

The signal levels of the GPIO_TXD (GPIO PORT) port and the GPIO_RXD (GPIO PORT) port are read (S220).

When the GPIO_RXD port is LOW (0 V) and the GPIO_TXD port is LOW (0 V), it is determined that there are no USB or UART connection signals from the external device. When the GPIO_RXD port is HIGH (3.3 V), it is determined that the UART signal is connected from the external device (S230) When the GPIO_TXD port is HIGH (3.3 V), it is determined that the USB signal is connected from the external device (S260).

When the UART signal from the external device is connected to the USB connector 1100, the status of the GPIO_RXD port and the status of the GPIO_TXD port are determined. When the status of the GPIO_RXD port and the status of the GPIO_TXD port are HIGH (3.3 V) and LOW (0 V), respectively, their functions are set from the GPIO function to the UART port status (S240). Thus, the UART communication is enabled (S250).

When the USB signal from the external device is connected to the USB connector 1100, the status of the GPIO_RXD port and the status of the GPIO_TXD port are determined. When the status of the GPIO_RXD port and the status of the GPIO_TXD port are LOW (0 V) and HIGH (3.3 V), respectively, their functions are set from the GPIO function to the USB port status (S270). Thus, the USB communication is enabled (S280).

Figure 13:
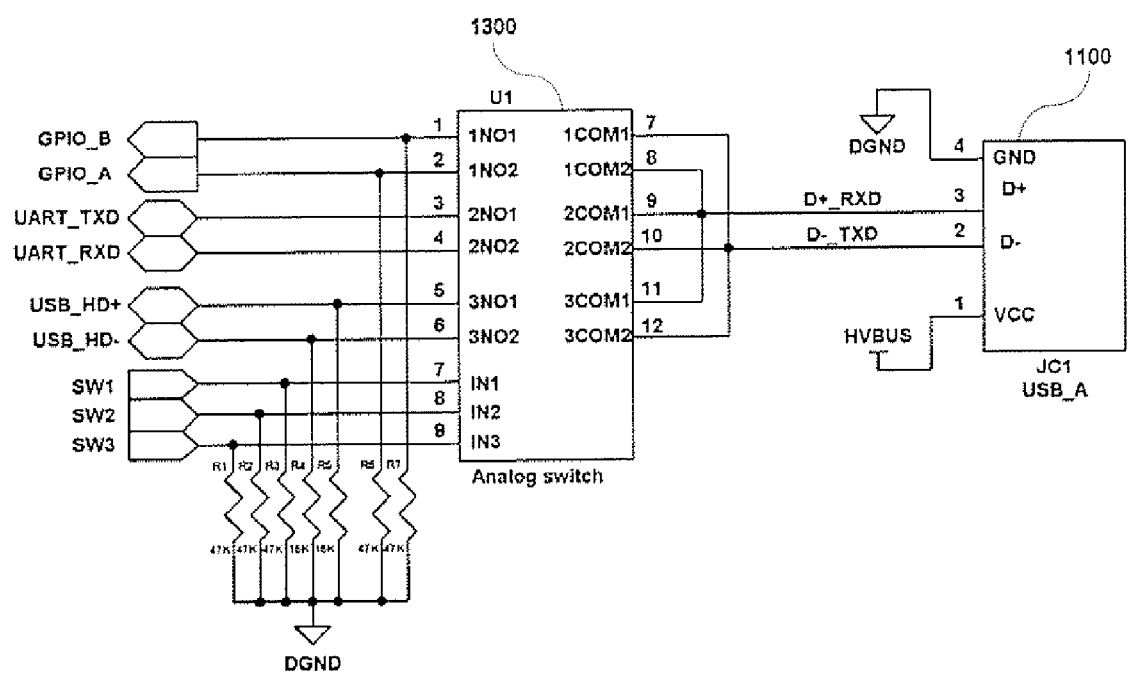
FIG. 13 is a circuit diagram of a communication system separately using USB/UART/GPIO functions according to an embodiment of the present invention.
Figure 14:
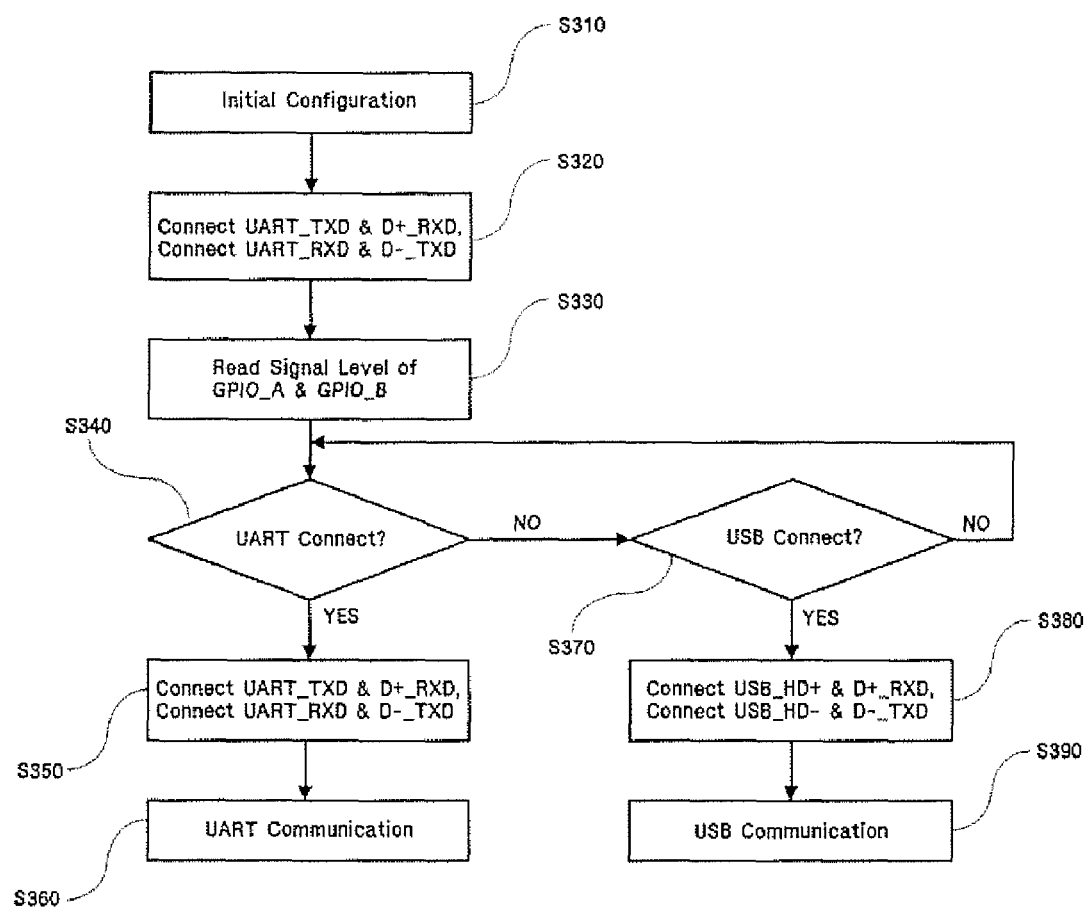
FIG. 14 is a flowchart illustrating an operation of a communication system separately using USB/UART/GPIO functions according to an embodiment of the present invention.

FIG. 13 is a circuit diagram of a communication system separately using USB/UART/GPIO functions according to an embodiment of the present invention, and FIG. 14 is a flowchart illustrating an operation of a communication system separately using USB/UART/GPIO functions according to an embodiment of the present invention.

Referring to FIG. 13, the USB connector signal line D+_RXD and the USB connector signal line D−_TXD are connected between the USB connector 1100 and the analog switch 1300. The USB connector signal line D+_RXD is connected to a GPIO_A port and a UART transmission signal (TXD) port or a USB host data (D+) signal (HD+) port The USB connector signal line D−_TXD is connected to a GPIO_B port and a UART reception signal (RXD) port or a USB host data (D−) signal (HD−) port The GIOP_A port, the GIOP_B port, the TXD port of the UART transmission signal, the RXD port of the UART reception signal, the HD+ port of the USB host data (D+) signal, the HD− port of the USB host data (D−), SW1, SW2 and SW3 of the switch selector are connected to the analog switch 1200.

In such a circuit configuration, the analog switch 1200 is used to control the UART port, the USB port, and the GPIO port.

In the initial status, the signal of the UART transmission signal (TXD) port of the external device is HIGH (3.3 V) and the signal line of the USB device data (D+) signal line is HIGH (3.3 V).

Therefore, the USB or UART communication can be selectively provided using the signal levels of the GPIO_A and GPIO_B ports.

More specifically, referring to FIG. 14, the switch selectors SW1, SW2 and SW3 connected to the analog switch 1200 are set to the initial state, that is, the default LOW state (0 V) (S310).

By setting the switch selector SW1 to HIGH (3.3 V), the GPIO_A port is connected to the USB connector signal line D+_RXD, and the GPIO_B port is connected to the USB connector signal line D−_TXD (S320).

At this point, the signal levels of the GPIO_A port and the GPIO_B port are read (S330). When the GPIO_A port is LOW (0 V) and the GPIO_B port is LOW (0 V), it is determined that there is no USB or UART connection signal from the external device. When the GPIO_B port is HIGH (3.3 V) and the GPIO_A port is low (0 V), it is determined that the UART signal is connected from the external device (S340). When the GPIO_A port is HIGH (3.3 V) and the GPIO_B port is LOW (0 V), it is determined that the USB signal is connected from the external device (S370).

When the UART signal from the external device is connected to the USB connector 1100, the states of the GPIO_A port and the GPIO_B port are read. When the states of the GPIO_A port and the GPIO_B port are LOW (0 V) and HIGH (3.3 V), respectively, the switch selector SW1 of the analog switch 1200 is set to LOW (0 V) and the switch selector SW2 is set to HIGH (3.3 V), so that the UART_TXD port and the UART_RXD port are connected to the D+_RXD port and the D−_TXD port (S350), respectively. Therefore, the UART communication is started (S360).

When the USB signal from the external device is connected to the USB connector 1100, a 1.5K pull-up resistor is connected to the HD+ port that is the USB host data (D+) port. Therefore, when the states of the GPIO_A port and the GPIO_B port are HIGH (3.3 V) and LOW (0 V), respectively, the switch selectors SW1, SW2 and SW3 of the analog switch 1200 are set to LOW (0 V), LOW (0 V), and HIGH (3.3 V), respectively, so that the USB_HD+ port, the USB_HD− port are connected to the D+_RD port and the D−_TXD port (S380). Therefore, the USB communication is enabled (S390).

The USB/UART common communication system according to the present invention will be described below in detail with reference to FIGS. 15 and 16.

Figure 15:
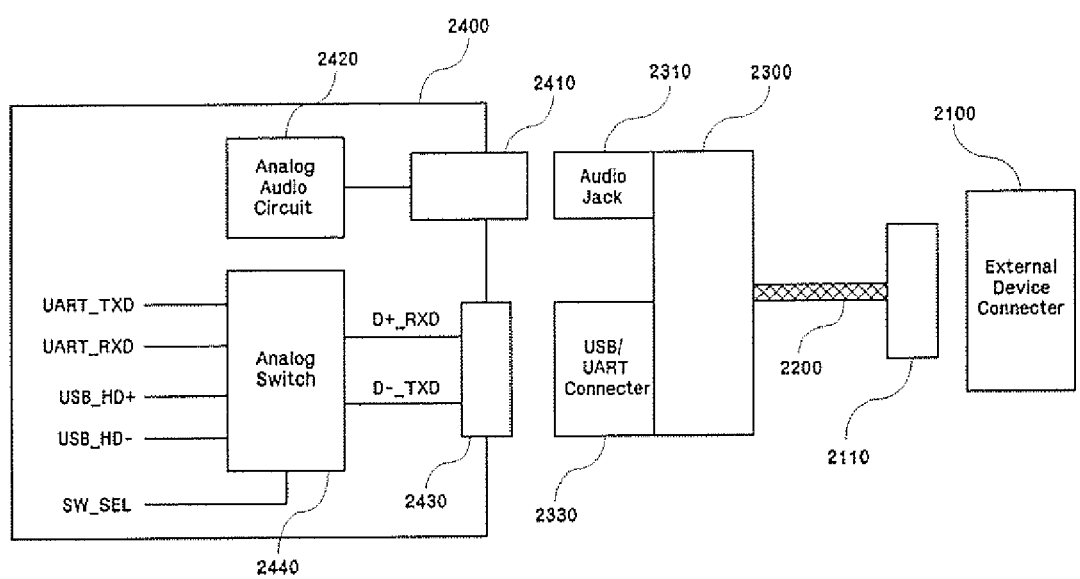
FIG. 15 is a block diagram of a USB/UART common communication system according to an embodiment of the present invention.

FIG. 15 is a block diagram of the USB/UART common communication system according to an embodiment of the present invention. The circuit configuration of the USB/UART common communication system will be described with reference to FIG. 9.

Referring to FIG. 15, a connector 2110 of an external device 2100 and a connector body 2300 are connected through a communication cable 2200. The connector body 2300 includes an audio jack 2310 and a USB/UART connector 2330.

The audio jack 2310 is connected to an audio jack connector 2410 of an audio device 2400, and the USB/UART connector 2330 is connected to a USB/UART connector 2430 of the audio device 2400. An analog audio circuit 2420 is connected to the audio jack connector 2410, and an analog switch 2440 is connected to the USB/UART connector 2430.

The USB connector signal line D+_RXD and the USB connector signal line D−_TXD are connected between the USB/UART connector 2430 and the analog switch 2440. The USB connector signal line D+_RXD is connected to the UART transmission signal (TXD) port or the HD+ port that is the USB host data (D+) port. The USB connector signal line D−_TXD is connected to the UART reception signal (RXD) port or the HD− port that is the USB host data (D−) port.

The UART transmission signal (TXD) port, the UART reception signal (RXD) port, the HD+ port, the HD− port, the switch selector SW_SEL are connected to the analog switch 2440.

Although not shown in FIG. 15, the signal lines UART_TXD, UART_RXD USB_HD+, USB_HD− and SW_SEL provided to the analog switch 2440 can be provided from or to the controller of the system.

Referring to FIG. 9, a capacitor C1 has one terminal connected to a pin No. 10 of the analog switch 2440 and a power VDD, and another terminal connected to a ground voltage. The capacitor C1 reduces ripples and noises in order to supply a stable constant voltage.

The connector 2100 of the external device provides an interface to the external device directly connected or an external device connected through an adapter. The connector 2100 of the external device may be a standard USB connector or a separately designed connector.

The communication cable 2200 is provided in a single line, and any communication cable can be used.

The connector body 2300 includes the audio jack 2310 for receiving L and R signals of the audio and the single USB/UART connector 2330 that can provide the USB/UART common communication connection.

The audio device 2400 represents an audio device applied to a car audio system or a home audio system to output audio/USB or audio/UART signals.

The analog audio circuit 2420 represents a circuit board in which various chips for implementing analog audio are built in.

The analog switch 2440 selectively set one of the UART connector signal line and the USB connector signal line as the signal path according to the select control signal of the switch selector SW_SEL.

In the path setting conditions of the switch selector SW_SEL when the USB connector signal line D−_TXD is HIGH (3.3 V) and the D+_RXD port of the USE connector signal line is LOW (0 V) in a default, i.e., an initial state, the path of the UART data line is selectively set. When the USB connector signal line D−_TXD is LOW (0 V) and the D+_RXD port of the USB connector signal line is HIGH (3.3 V), the path of the USB data line is selectively set. In this way, the USB or UART common audio signal can be received or transmitted.

In the conventional car audio or home audio system, the USB connector, the UART connector, and the audio connector are separately provided. Therefore, when the USB connector and the audio connector are used, the USB cable and the audio cable must be separately used. When the UART connector and the audio connector are used, the UART cable and the audio cable must be separately used. However, according to the present invention, the audio/USB or audio/UART signal can be outputted in the audio device 2400 through the common audio signal line by using the single audio/USB/UART common connector through the connection of the single communication cable 2200 between the connector 2110 of the external device 2100 and the connector body 2300.

Figure 16:
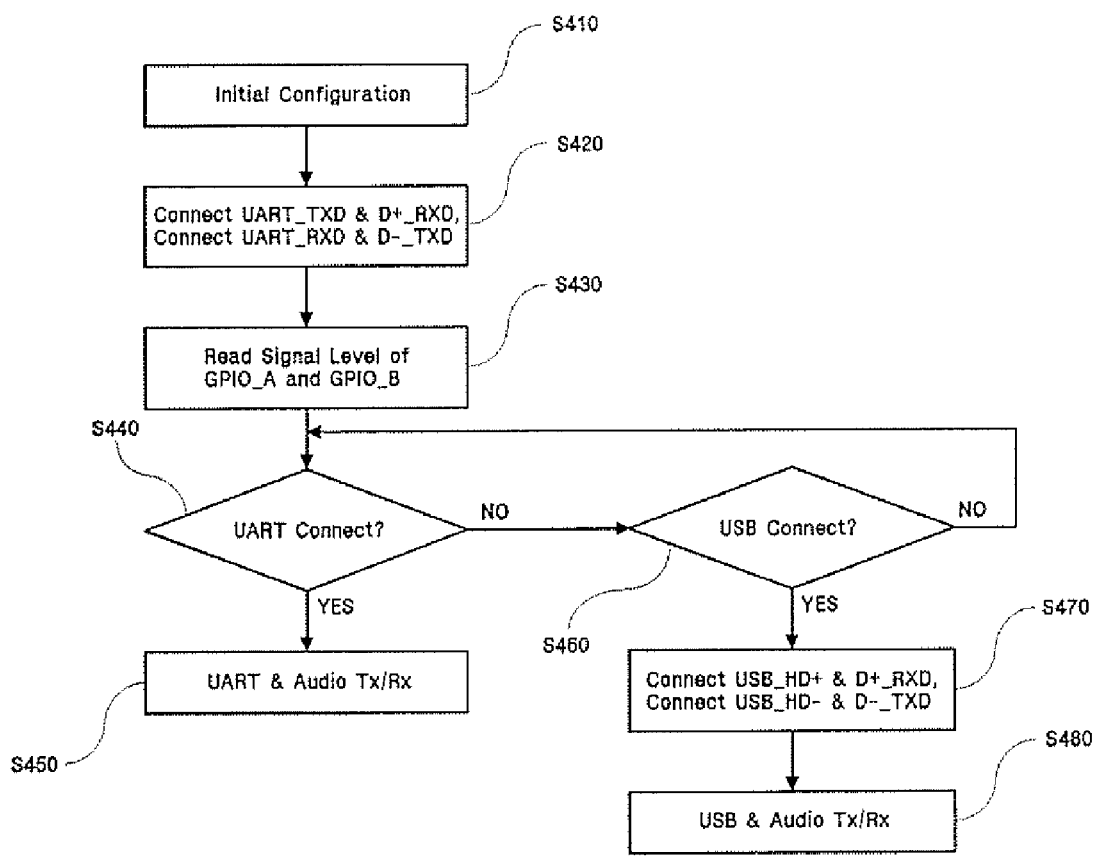
FIG. 16 is a flowchart illustrating an operation of a USB/UART common communication system according to an embodiment of the present invention.

FIG. 16 is a flowchart illustrating an operation of the USE/UART common communication system according to an embodiment of the present invention.

The switch selector SW_SEL connected to the analog switch 2440 of the audio device 2400 is set to the initial state, that is, the default LOW state (0 V) (S410).

In the default state of the switch selector SW_SEL the UART transmission signal (TXD) port and the USB connector signal line D+_RXD are connected to each other, and the UART reception signal (RXD) port and the USB connector signal line D−_TXD are connected to each other (S420).

The signal levels of the GPIO_A port and the GPIO_B port are read (S430). When the GPIO_A port is LOW (0 V) and the GPIO_B port is LOW (0 V), it is determined that there are no USB and UART connection signals from the external device.

When the GPIO_B port is HIGH (3.3 V) and the GPIO_A port is LOW (0 V), it is determined that the UART signal from the external device is connected (S440). When the GPIO_A port is HIGH (3.3 V) and the GPIO_B port is LOW (0 V), it is determined that the USB signal from the external device is connected (S460).

When the UART connection signal is connected to the USB/UART connector 2330 through the connector 2110 of the external device, the UART transmission signal (TXD) port and the UART reception signal (RXD) port are changed from the GIPO function to the UART port states in the audio/USB/UART common connectors 2310, 2410, 2330 and 2430 connected through the single cable 2200. Therefore, the audio/UART signal can be transmitted or received in the audio device 2400.

When the signal connected to the USB/UART connector 2330 is not the UART connection signal from the connector 2110 of the external device, the signal of the UART transmission signal (TXD) port (GPIO PORT) and the signal of the UART reception signal (RXD) port (GPIO PORT) are read in the audio/USB/UART common connectors 2310, 2410, 2330 and 2430 connected through the single cable 2200. Then, it is determined whether the USB connection signal exists by comparing the values with the HIGH (3.3 V) state and the LOW (0 V) state (S470).

When the USB connection signal from the connector 2110 of the external device exists in the USB/UART connector 2330, the switch selector SW_SEL of the analog switch 2440 is set to the HIGH (3.3 V) state.

At this point, the USB_HD+ port that is the USB host data (D+) port is connected to the USB connector signal line D+_RXD, and the USB_HD− port that is the USB host data (D−) port is connected to the USB connector signal line D−_TXD (S470). Therefore, the audio/USB signal can be transmitted/received in the audio device 2400 (S480).

When the USB connection signal from the connector 2110 of the external device does not exist in the USB/UART connector 2330, it is determined that there are no USB and UART connection signals.

Although the above description has been made about the microcontroller unit (MCU) commonly using the GPIO port and the UART port and using the analog switch, the present invention can also be applied to an MCU commonly using the GPIO port and the UART port and using no analog switch 1200. Further, the present invention can be applied to the case where the GPIO port and the UART port are not commonly used, that is, the UART port is used as the dedicated port of the MCU.

The audio system of the present invention sets the path of the signal line according to a specific communication of the external device connected to the USB connector. Then, the digital audio file stored in the external device is uploaded according to the user's manipulation of the audio device, such that the sound can be outputted from the audio device.

In addition, the audio system provides the interface to the external device using the USB connector of the USB communication or the expansion connector of the serial communication. Therefore, the external device can be used without external modification or installation of a dedicated interface.

Furthermore, the USB/UART common communication system automatically detects the USB connection signal and the UART connection signal through the single USB connector, and uses it as the common data signal line. Therefore, the user can commonly use the USB connector without regard to the USB and UART connection signals.

Moreover, the USB/UART common communication system can selectively detect the audio/USB or audio/UART signal through a common audio signal line by using the connector of the external device, connected through a single cable, and the single audio/USB/UART common connector. Therefore, the audio device can selectively output the audio/USB or audio/UART signals through the single cable.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An audio system which accommodates an external device, comprising:
    an adapter having an external device connector at one terminal and a USB connector at another terminal to provide a signal connection therebetween, the external device connector being provided for connection to the external device; and
    an audio device which includes:
    a USB connector which provides an interface to an external device connected either directly thereto or through the adapter;
    a multiplexer which establishes a signal path to the USB connecter by either a USB signal line or a serial signal line corresponding to a selection control signal;
    a USB controller, connected to the external device through the USB signal line, which decodes a digital audio file received from the external device so as to output a sound;
    a serial controller, connected to the external device via the adapter through the serial signal line, which receives song information through the serial signal line so as to provide the external device with a device control signal based on a user operation; and
    an audio controller which provides the multiplexer with the selection control signal based on a device identification when the external device is connected via the USB connector, moves the digital audio file from the external device through the USB controller in the case that the external device is a USB device, receives the song information from the external device through the serial controller and provides the device control signal to the external device so as to let the external device be driven in response to the device control signal in the case that the external device is not a USB device.

2. The audio system according to claim 1,
    wherein the audio controller performs communication when the external device is connected to the USB connector, and establishes a signal path by determining whether the external device is the USB device based on a result of the communication.

3. An audio system which accommodates an external device, comprising:
    an adapter having an external device connector at one terminal and a USB connector at another terminal to provide a signal connection therebetween, the external device connector being provided for connection to the external device; and
    an audio device which includes:
    a USB connector which provides an interface to an external device connected either directly thereto or through the adapter;
    a USB controller, connected to the external device through a USB signal line, which decodes a digital audio file received from the external device so as to output a sound;
    a serial controller, connected to the external device via the adapter through a serial signal line, which receives song information through the serial signal line so as to provide the external device with a device control signal based on a user operation; and an audio controller which establishes a signal path of either the USB signal line or the serial signal line corresponding to an external device identification based on a communication result when the external device is connected to the USB connector, moves the digital audio file from the external device through the USB controller in the case that the external device is a USB device, receives song information from the external device through the serial controller and provides the device control signal to the external device so as to let the external device be driven in response to the device control signal in the case that the external device is not a USB device.

4. The audio system according to claim 1,
wherein the audio system utilizes a universal asynchronous receiver/transmitter (UART).

5. The audio system according to claim 4,
wherein the adapter transmits and receives a UART signal to and from the USB connector through a signal line connection of an expanded external connector and the USB connector, so that the signal connection is provided between an external device having an expansion connector and an audio device having the USB connector.

6. A USB/UART common communication system comprising:
a connector which provides an interface to an external device, the connector having signal lines (D+_RXD, D−_TXD);
an analog switch which selects one of UART data signal lines (UART_TXD, UART_RXD) and USB data signal lines (USB_HD+, USB_HD−) with respect to the signal lines (D+_RXD, D−_TXD) of the connector according to a selection control signal; and
a system controller which sets the UART data signal lines as GPIO ports so as to read a signal level of the UART data signal lines, detects whether the connector is connected to a UART or a USB according to a reading result, sets the UART data signal lines as UART ports interconnects the UART data signal lines and the connector signal lines in response to the selection control signal so as to perform UART communication in the case that a UART connection signal is detected, and establishes a connection between the USB data signal lines and the connector signal lines through the analog switch so as to perform USB communication in the case that a USB connection signal is detected.

7. The USB/UART common communication system according to claim 6,
wherein when the D+_RXD signal line is HIGH and the D−_TXD signal line is LOW, it is determined that the USB is connected to the connector.

8. The USB/UART common communication system according to claim 6,
wherein when the D−_TXD signal line is HIGH and the D+_RXD signal line is LOW, it is determined that the UART is connected to the connector.

9. A USB/UART common communication system comprising:
a connector which provides an interface to an external device, the connector having first signal line ports (GPIO_TXD, GPIO_USB_HD+) and second signal line ports (GPIO_RXD, GPIO_USB_HD−) connected to signal line data (D+, D−); and
a system controller which sets the first and second signal line ports as GPIO ports so as to read a signal level of UART data signal lines, detects whether the connector is connected to a UART or a USB according to a reading result, sets the signal line ports (GPIO_TXD, GPIO_RXD) as UART ports and performs UART communication in the case that a UART connection signal is detected, and sets the signal line ports (GPIO_USB_HD+, GPIO_USB_HD−) as USB ports and performs USB communication.

10. The USB/UART common communication system according to claim 9,
wherein when the second signal line port (GPIO_RXD) is HIGH and the first signal line port (GPIO_TXD) is LOW, it is determined that the UART is connected to the connector.

11. The USB/UART common communication system according to claim 9,
wherein when the first signal line port (GPIO_TXD) is HIGH and the second signal line port (GPIO_RXD) is LOW, it is determined that the USB is connected to the connector.

12. A USB/UART common communication system comprising:
a connector which provides an interface to an external device, the connector having signal lines (D+_RXD, D−_TXD);
an analog switch which is connected to GPIO detection signal lines (GPIO_A, GPIO_B), UART data signal lines (UART_TXD, UART_RXD), and USB data signal lines (USB_HD+, USB_HD−), and selects one of the GPIO detection signal lines, the UART data signal lines, and the USB data signal lines with respect to the connector signal lines according to a selection control signal; and
a system controller which reads a signal level of the connector signal lines, detects whether the connector is connected to a UART or a USB according to a reading result, interconnects the UART data signal lines and the connector signal lines according to the selection control signal so as to perform UART communication in the case that a UART connection signal is detected, and interconnects the USB data signal lines and the connector signal lines through the analog switch so as to perform USB communication in the case that a USB connection signal is detected.

13. The USB/UART common communication system according to claim 12,
wherein when the GPIO detection signal line (GPIO_B) is HIGH and the GPIO detection signal line (GPIO_A) is LOW, it is determined that the UART is connected to the connector.

14. The USB/UART common communication system according to claim 12,
wherein when the GPIO detection signal line (GPIO_A) is HIGH and the GPIO detection signal line (GPIO_B) is LOW, it is determined that the USB is connected to the connector.

* * * * *